US012547108B2

(12) United States Patent
Oguma et al.

(10) Patent No.: US 12,547,108 B2
(45) Date of Patent: Feb. 10, 2026

(54) IMAGE FORMING APPARATUS WITH ANTIMICROBIAL TONER

(71) Applicant: CANON KABUSHIKI KAISHA, Tokyo (JP)

(72) Inventors: Toru Oguma, Shizuoka (JP); Kazuhisa Shida, Kanagawa (JP); Atsushi Toda, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/911,817

(22) Filed: Oct. 10, 2024

(65) Prior Publication Data

US 2025/0036058 A1 Jan. 30, 2025

Related U.S. Application Data

(63) Continuation of application No. PCT/JP2023/006990, filed on Feb. 27, 2023.

(30) Foreign Application Priority Data

Apr. 11, 2022 (JP) ................................ 2022-065261

(51) Int. Cl.

| | |
|---|---|
| ***G03G 15/36*** | (2006.01) |
| ***G03G 15/01*** | (2006.01) |
| ***G03G 15/04*** | (2006.01) |
| ***G06K 15/02*** | (2006.01) |

(52) U.S. Cl.

CPC ......... *G03G 15/36* (2013.01); *G03G 15/0189* (2013.01); *G03G 15/04018* (2013.01); *G06K 15/1852* (2013.01); *G03G 2215/0604* (2013.01)

(58) Field of Classification Search

CPC ....................... G03G 15/6585; G03G 15/5058

See application file for complete search history.

(56) References Cited

U.S. PATENT DOCUMENTS

| | | | | |
|---|---|---|---|---|
| 10,241,457 | B1 * | 3/2019 | Alexandrovich | G03G 15/18 |
| 10,732,542 | B2 * | 8/2020 | Tanaka | G03G 21/1676 |

(Continued)

FOREIGN PATENT DOCUMENTS

| | | | |
|---|---|---|---|
| CN | 111965962 | A | 11/2020 |
| JP | 2003241414 | A | 8/2003 |
| JP | 2004093784 | A | 3/2004 |

(Continued)

*Primary Examiner* — Jessica L Eley

(74) *Attorney, Agent, or Firm* — Canon U.S.A., Inc., IP Division

(57) ABSTRACT

An image forming apparatus includes: a forming unit configured to form an image on a sheet by forming a plurality of toner images using a plurality of types of toner, and transfer the plurality of toner images onto the sheet, or transfer the plurality of toner images onto the sheet via an intermediate transfer member; and a controller configured to control the forming unit to form a formed image and an antimicrobial pattern on the sheet based on first image data representing the formed image, wherein at least one first toner out of the plurality of types of toner is antimicrobial toner that includes an antimicrobial agent, at least one second toner out of the plurality of types of toner is non-antimicrobial toner that does not contain the antimicrobial agent, and the antimicrobial pattern is formed using the first toner.

20 Claims, 15 Drawing Sheets

(56) References Cited

U.S. PATENT DOCUMENTS

| | | | | |
|---|---|---|---|---|
| 2013/0071143 | A1* | 3/2013 | Blanton | G03G 9/1355 399/223 |
| 2016/0327879 | A1* | 11/2016 | Farrugia | G03G 9/09392 |

FOREIGN PATENT DOCUMENTS

| | | | |
|---|---|---|---|
| JP | 2005227523 | A | 8/2005 |
| JP | 2008255522 | A | 10/2008 |
| JP | 2012002869 | A | 1/2012 |
| JP | 2016212396 | A | 12/2016 |
| JP | 2023010285 | A | 1/2023 |

* cited by examiner

FIG. 12

| EXAMPLE | DETAILS | COST | HANDLING | ANTIMICROBIAL IN REGION OTHER THAN FORMED IMAGE |
|---|---|---|---|---|
| EXAMPLE 1 | MAKE PORTION ANTIMICROBIAL REGION | ○ | △ | × |
| EXAMPLE 2 | MAKE END PORTION ANTIMICROBIAL REGION | ○ | △ | × |
| EXAMPLE 3 | ANTIMICROBIAL REGION OF BACK SURFACE LARGER THAN ANTIMICROBIAL REGION OF FRONT SURFACE | ○ | ○ | × |
| EXAMPLE 4 | BACK SURFACE ANTIMICROBIAL REGION AND FRONT SURFACE ANTIMICROBIAL REGION ARE SAME | ○ | ○ | × |
| EXAMPLE 5 | MAKE REGION OTHER THAN FORMED IMAGE ANTIMICROBIAL REGION | ○ | △ | ○ |
| EXAMPLES 2+4+5 | COMBINATION OF WORKING EXAMPLES 2+4+5 | ○ | ○ | ○ |
| COMPARISON EXAMPLE | ALL REGIONS ON ONE SURFACE ARE ANTIMICROBIAL REGIONS | × | △ | × |

IMAGE FORMING APPARATUS WITH ANTIMICROBIAL TONER

CROSS-REFERENCE TO RELATED APPLICATIONS

This application is a Continuation of International Patent Application No. PCT/JP2023/006990, filed Feb. 27, 2023, which claims the benefit of Japanese Patent Application No. 2022-065261, filed Apr. 11, 2022, both of which are hereby incorporated by reference herein in their entirety.

BACKGROUND OF THE INVENTION

Field of the Invention

The present invention relates to an image forming apparatus that forms an image on a recording medium using toner that includes an antimicrobial agent.

Background Art

Prescriptions and medical questionnaires handled in medical facilities and the like have started to be digitized in recent years, but are still handled in the form of print articles printed by image forming apparatuses such as printers in most cases. Print articles may be used by a plurality of persons when passed around in a circulated memo or the like. Therefore, when a person with pathogenic bacteria on his/her hand or finger uses a print article, infection may spread via the print article. There are known methods for adding antimicrobial properties to print articles by using toner that contains an antimicrobial agent (hereinafter, referred to as "antimicrobial toner") in order to suppress spread of infection via print articles. Japanese Patent Laid-Open No. 2004-93784 and Japanese Patent Laid-Open No. 2005-227523 disclose antimicrobial toner.

Antimicrobial toner costs more than normal toner. Therefore, image forming apparatuses are required to suppress an increase in the cost due to the use of antimicrobial toner while maintaining antimicrobial effect.

SUMMARY OF THE INVENTION

According to an aspect of the present invention, an image forming apparatus includes: an image forming unit configured to form an image on a sheet by forming a plurality of toner images using a plurality of types of toner, and transfer the plurality of toner images onto the sheet, or transfer the plurality of toner images onto the sheet via an intermediate transfer member; and a controller configured to control the image forming unit to form a formed image and an antimicrobial pattern on the sheet during image formation that is based on first image data representing the formed image, wherein at least one first toner out of the plurality of types of toner is antimicrobial toner that includes an antimicrobial agent, at least one second toner out of the plurality of types of toner is non-antimicrobial toner that does not contain the antimicrobial agent, and the antimicrobial pattern is formed using the first toner.

Further features of the present invention will become apparent from the following description of exemplary embodiments with reference to the attached drawings.

BRIEF DESCRIPTION OF THE DRAWINGS

FIG. 12 is a diagram showing comparison results between a comparison example and the examples.

DESCRIPTION OF THE EMBODIMENTS

Figure 1:
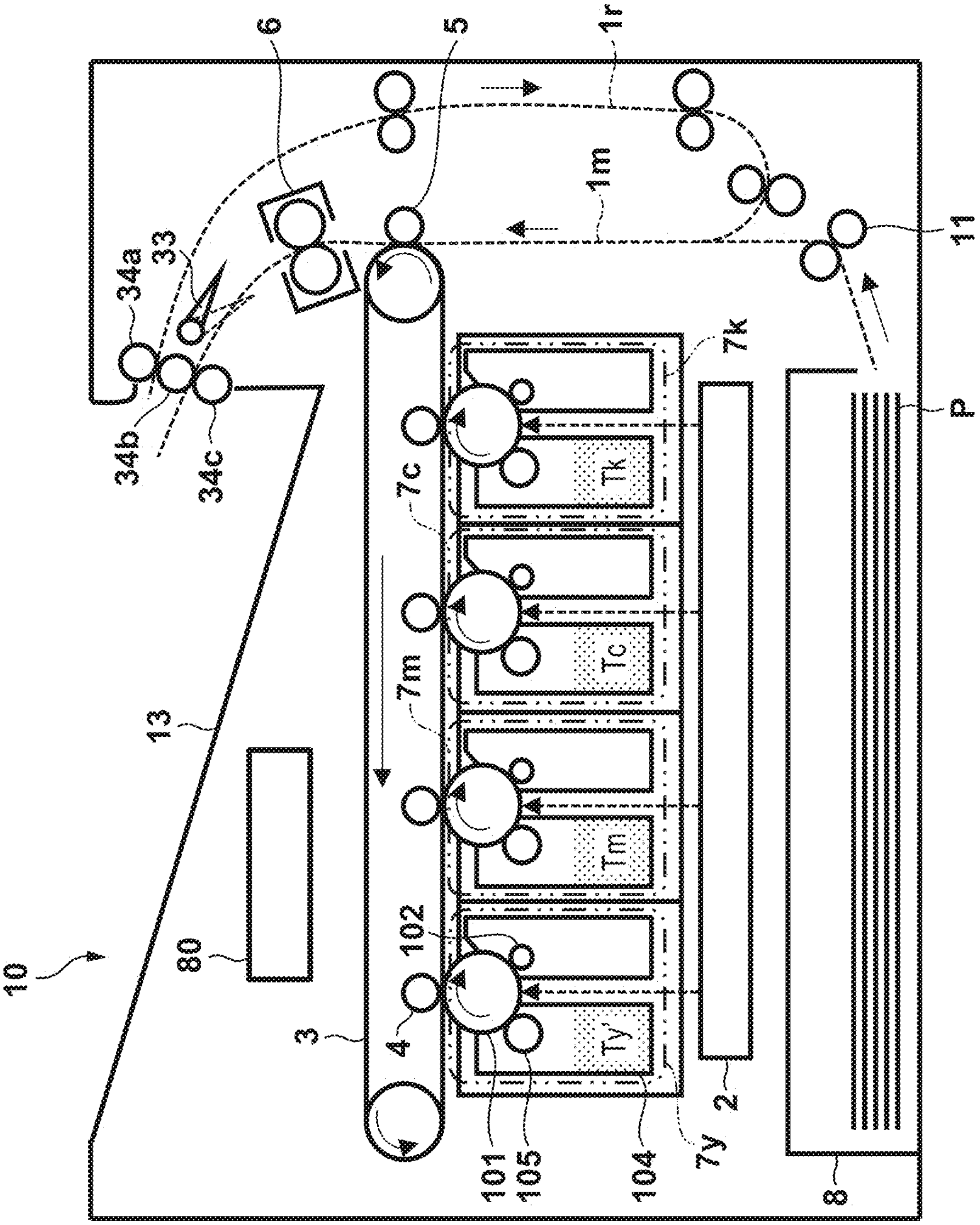
FIG. 1 is a schematic cross-sectional view of an image forming apparatus according to an embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

FIG. 1 is a schematic cross-sectional view of an image forming apparatus 10 according to the present embodiment. The image forming apparatus 10 forms an image on a sheet P that is a recording medium stored in a cassette 8. In the following description, the sheet P on which an image has been formed is also referred to as a "print article". The image forming apparatus 10 includes process cartridges 7_y_, 7_m_, 7_c_, and 7_k_ that are detachable from the main body thereof. In the following description, a "process cartridge" is also referred to as a "cartridge" simply. The cartridges 7_y_, 7_m_, 7_c_, and 7_k_ respectively form yellow, magenta, cyan, and black toner images, and transfer the images onto an intermediate transfer member 3. The cartridges 7_y_, 7_m_, 7_c_, and 7_k_ have similar configurations, and, hereinafter, are also referred to as "cartridges 7" in a collective manner. Each cartridge 7 includes a photosensitive member 101, a charging roller 102, a toner storage portion 104, and a developing roller 105. Note that the toner storage portions 104 of the cartridges 7_y_, 7_m_, 7_c_, and 7_k_ contain yellow toner Ty', magenta toner Tm, cyan toner Tc, and black toner Tk, respectively.

In the present embodiment, the yellow toner Ty' is toner that contains an antimicrobial agent, that is to say, antimicrobial toner, and the toner of the other colors is non-antimicrobial toner that contains no antimicrobial agent. In the present embodiment, toner of at least one color out of toner of a plurality of colors used by the image forming apparatus 10 to form an image is used as antimicrobial toner, and toner of at least one color is used as non-antimicrobial toner. By using toner of at least one color as non-antimicrobial toner, it is possible to suppress the cost compared with a case where toner of all of the colors is used as antimicrobial toner. Note that, in the present embodiment, as described above, toner of one color, that is to say, the yellow color is used as antimicrobial toner, and toner of the remaining three colors is used as non-antimicrobial toner.

At the time of image formation, the photosensitive members 101 are rotated and driven in the clockwise direction in the figure. The charging rollers 102 charge the photosensitive members 101 by outputting an electrostatic voltage. A scanner unit 2 emits a light beam to the photosensitive members 101 based on image data for forming an image on the sheet P, and exposes the photosensitive members 101, thereby forming electrostatic latent images on the photosensitive members 101. The developing rollers 105 form toner images on the photosensitive members 101 by outputting a developing voltage such that toner contained in the toner storage portions 104 adhere to the electrostatic latent images of the photosensitive members 101. Primary transfer rollers 4 provided in correspondence with the cartridges 7 transfer the toner images of the photosensitive members 101 of the corresponding cartridges 7 to the intermediate transfer member 3 by outputting a primary transfer voltage. Note that the intermediate transfer member 3 is rotated and driven in the counterclockwise direction in the figure at the time of image formation. By transferring the toner images on the photosensitive members 101 onto the intermediate transfer member 3 in layers, colors different from yellow, magenta, cyan, and black can be reproduced. By the intermediate transfer member 3 rotating, the toner image on the intermediate transfer member 3 is conveyed to a position opposing a secondary transfer roller 5.

On the other hand, the sheet P stored in the cassette 8 is fed to a main conveyance path 1*m* by a feeding unit (not illustrated), and is conveyed to a position opposing the secondary transfer roller 5 by conveyance rollers 11. The secondary transfer roller 5 transfers the toner image on the intermediate transfer member 3 onto the sheet P by outputting a secondary transfer voltage. A fixing unit 6 fixes the toner image to the sheet P by heating/pressurizing the sheet P. When forming an image on only one surface of the sheet P, a flapper 33 is set in an orientation indicated by the solid lines in the figure, and the sheet P is discharged to a discharge tray 13 by an intermediate roller 34*b* and a second discharge roller 34*c*. On the other hand, when forming images on the two surfaces of the sheet P, the flapper 33 is set in an orientation indicated by the dotted lines in the figure, and the sheet P is first conveyed toward the outside of the image forming apparatus 10 by the intermediate roller 34*b* and a first discharge roller 34*a*. When the trailing edge of the sheet P moves past the flapper 33, the flapper 33 is set in an orientation indicated by the solid lines in the figure, and the rotation directions of the intermediate roller 34*b* and the first discharge roller 34*a* are reversed. Accordingly, the sheet P is conveyed to the main conveyance path 1*m* via a double-side conveyance path 1*r*, and image formation is performed on the other side of the sheet P.

A control unit 80 performs overall control of the image forming apparatus 10. The control unit 80 includes one or more processors and one or more storage devices, for example. The one or more storage devices may include a volatile storage device and a nonvolatile storage device. The one or more processors control the image forming apparatus 10 by executing a program stored in the one or more storage devices. Although a detailed description will be described later, when adding antimicrobial properties to a print article, the image forming apparatus 10 forms, on the sheet P, a composite image that includes an image formed on the sheet P by the user (hereinafter, a "formed image") and an antimicrobial pattern image formed using antimicrobial toner. For this reason, the control unit 80 generates image data of the composite image based on image data of the formed image and image data of the antimicrobial pattern image (hereinafter, simply referred to as an "antimicrobial pattern"). Note that the control unit 80 obtains the image data of the formed image, for example, from an external apparatus via a communication interface (not illustrated). In addition, when the image forming apparatus 10 includes a reading unit that optically reads the surface of a document, the control unit 80 may also obtain the image data of the formed image from the reading unit. The image data of the antimicrobial pattern may be stored in the one or more storage devices in advance, for example. The scanner unit 2 exposes the photosensitive members 101 based on the image data of the composite image, and forms electrostatic latent images on the photosensitive members 101.

Figure 2:
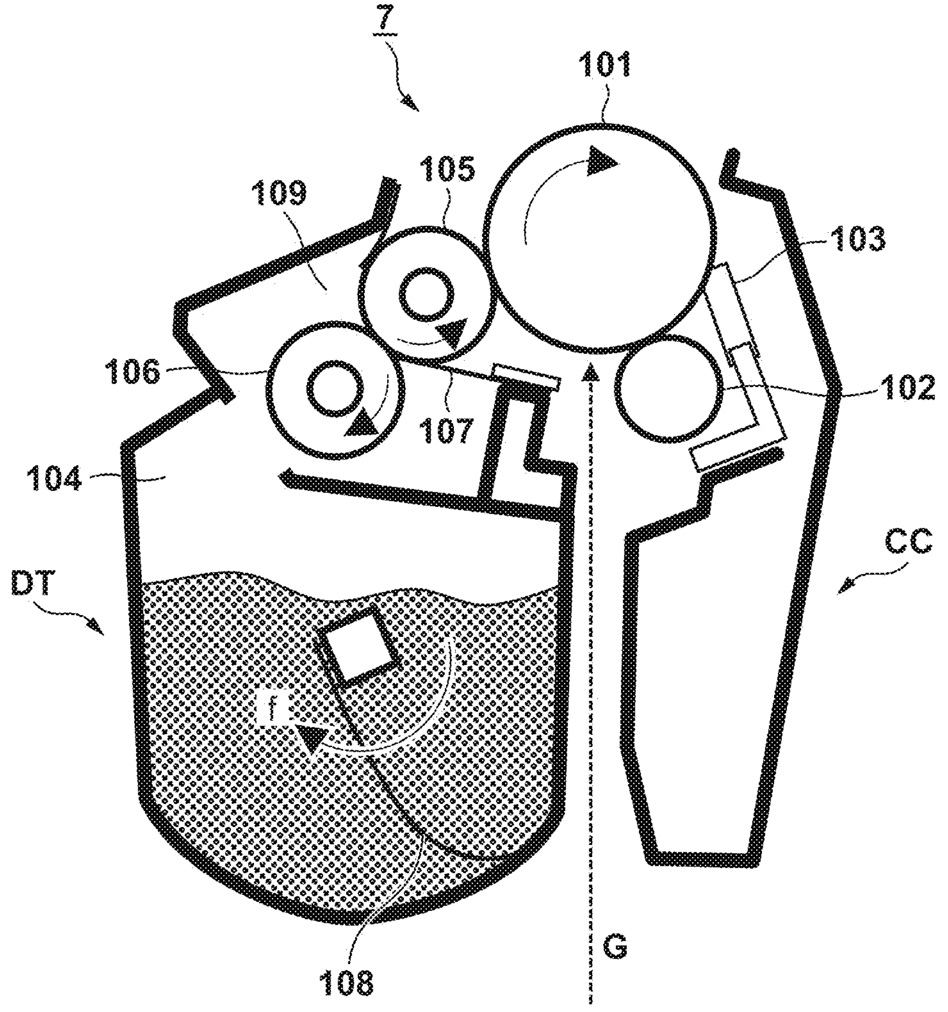
FIG. 2 is a schematic cross-sectional view of a process cartridge according to an embodiment.

FIG. 2 is a diagram of a detailed configuration of a cartridge 7. The cartridge 7 includes a photosensitive member unit CC and a development unit DT. In addition to the photosensitive member 101 and the charging roller 102 that have been already described, the photosensitive member unit CC includes a cleaning member 103 that removes, from the photosensitive member 101, toner that has not been transferred onto the intermediate transfer member 3 and remains on the photosensitive member 101.

The developing roller 105 of the development unit DT comes into contact with the photosensitive member 101, and is rotated and driven in the counterclockwise direction of the figure. Furthermore, the development unit DT includes a supply roller 106 that is rotated and driven in the clockwise direction in the figure. The supply roller 106 supplies toner to the developing roller 105, and removes toner remaining on the developing roller 105 from the developing roller 105. Furthermore, the development unit DT includes a developing blade 107 that restricts the layer thickness of toner that is supplied to the developing roller 105 by the supply roller 106.

The toner storage portion 104 is provided with a conveyance member 108 that is rotatably supported. The conveyance member 108 rotates in the clockwise direction (arrow f direction) in the figure, stirs toner in the toner storage portion 104, and conveys toner to a developing chamber 109 in which the developing roller 105 and the supply roller 106 are provided.

Known inorganic antimicrobial agent and organic antimicrobial agent can be used as the antimicrobial agent contained in the antimicrobial toner. Note that an inorganic antimicrobial agent, which has excellent heat resistance and stability, is suitable. Metal-based and metallic compound-based antimicrobial agents, an oxide photocatalytic antimicrobial agent, and the like can be used as the inorganic antimicrobial agent. Silver, copper, zinc, and the like can be used as the metal, can also be used in forms of metallic elements and/or antimicrobial metal ions, and can also be supported on other inorganic materials. Examples of a carrier that supports antimicrobial metal include alumina, zeolite, silica gel, phosphate-based compounds, calcium carbonate, calcium silicate, and silicate glass, and there is no limitation thereto.

In addition, anatase-type titanium dioxide and the like can be used as the oxide photocatalytic antimicrobial agent. Oxide-based photocatalysts undergo charge separation and generate electrons and holes when exposed to light with a wavelength of 400 nm or less. The holes react with water vapor or oxygen in the air, generate reactive oxygen species such as OH radicals, which can kill microorganisms due to the strong oxidizing power thereof. From among the above antimicrobial agents, particularly, a silver-based antimicrobial agent has a broad antimicrobial spectrum, and has a high antimicrobial activity. Furthermore, two or more types of antimicrobial agents can be used as necessary.

Toner according to the present embodiment includes toner particles that include a binder resin such as a styrene-based copolymer resin or a polyester resin and an external additive agent, for example. In addition, a known release agent (wax) and a known charge control agent may be used for toner particles in order to add release properties to the toner. In addition, toner according to the present embodiment may be any of magnetic single-component toner, non-magnetic single-component toner, and non-magnetic two-component toner. Furthermore, a method for manufacturing toner is not particularly limited, and it is possible to use a known method such as a grinding method, a suspension polymerization method, or an emulsion aggregation method.

Figure 3:
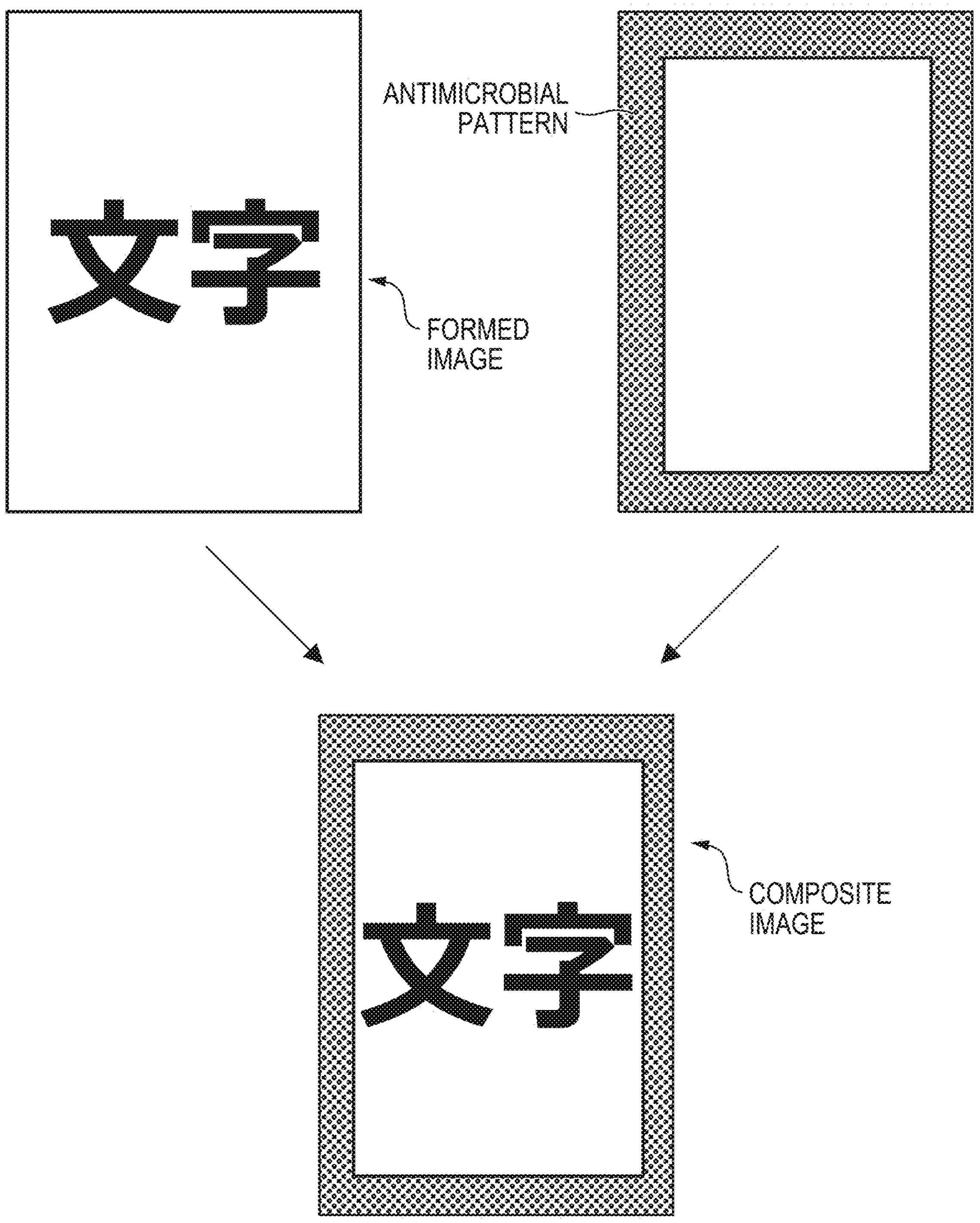
FIG. 3 is a diagram showing an example of a formed image, an antimicrobial pattern image, and a composite image according to an embodiment.

Next, a composite image that includes an antimicrobial pattern will be described with reference to FIG. 3. As described above, in the present embodiment, in addition to a formed image, a composite image to which an antimicrobial pattern for exhibiting an antimicrobial effect has been added is formed on the sheet P. FIG. 3 shows a formed image (upper left), an antimicrobial pattern (upper right), and a composite image (on the lower side). Note that the antimicrobial pattern is formed using the antimicrobial toner, that is to say, the yellow toner Ty' in an example of the present embodiment. The formed image may be formed using toner of one or more colors among yellow, cyan, magenta, and black based on image data. In FIG. 3, the antimicrobial pattern is a mid-tone image having a predetermined width along the periphery of a sheet.

The antimicrobial pattern can be formed with the maximum tone (density) or mid tone (density). The tone of a mid-tone pattern image may be expressed by the density of dots formed through halftone processing such as dithering processing, or may be expressed by the toner amounts of dots. Note that the toner amounts of dots can be controlled by controlling the exposure intensity of the photosensitive members 101. In addition, the tone of the entire antimicrobial pattern does not need to be fixed, and the tone may differ within the antimicrobial pattern. As described above, the image data for the antimicrobial pattern can be stored in the control unit 80 in advance.

Note that, instead of forming an antimicrobial pattern based on image data for the antimicrobial pattern, intentionally-caused ghosting can be used for an antimicrobial pattern. Ghosting can be intentionally caused and the density thereof can be controlled, for example, by adjusting one of or both an electrostatic voltage output by the charging roller 102 and a developing voltage output by the developing roller 105. When toner adheres in an region of the photosensitive member 101 in which the absolute value of the voltage is smaller than the absolute value of the developing voltage, for example, ghosting can be intentionally caused by adjusting the electrostatic voltage and/or the developing voltage such that the absolute value of the voltage of the photosensitive member 101 is smaller than the absolute value of the developing voltage. In addition, by increasing the difference between the voltage on the surface of the photosensitive member 101 and the developing voltage, the density of ghosting can be increased.

When forming an antimicrobial pattern through ghosting, a belt-like pattern or the like in the main scanning direction of the photosensitive member 101 (rotation axis direction of the photosensitive member 101) can be formed, but a belt-like pattern or the like in the sub-scanning direction (a direction orthogonal to the main scanning direction) cannot be formed. Note that the sub-scanning direction corresponds to the conveyance direction of the sheet P, and the main scanning direction is a direction orthogonal to the sub-scanning direction. In addition, when forming an antimicrobial pattern through ghosting, the electrostatic voltage and/or the developing voltage is adjusted to a value different from a value at the time of normal image formation, and thus, it is not possible to form both an antimicrobial pattern and a formed image that uses the color of the antimicrobial toner, at the same position in the main scanning direction. For this reason, a configuration can be adopted in which an antimicrobial pattern that is formed through ghosting is formed within a region in the sub-scanning direction in which the formed image is not included, for example. Alternatively, a configuration can be adopted in which, when forming an antimicrobial pattern through ghosting, antimicrobial toner is used only for forming an antimicrobial pattern, and a formed image is formed using non-antimicrobial toner only.

Note that, when forming an antimicrobial pattern based on image data, there is an advantage of being able to form various antimicrobial patterns. On the other hand, when forming an antimicrobial pattern through intentional ghosting, it is possible to cause the antimicrobial toner to adhere to a print article outside a region in the main scanning direction that is normally exposed. Therefore, the control unit 80 can be configured to be able to form both an antimicrobial pattern that is based on image data and an antimicrobial pattern that is formed through ghosting. In this case, the control unit 80 can form one of the antimicrobial patterns based on settings.

As described above, the antimicrobial pattern can be any pattern having any tone, but, as long as antimicrobial properties are ensured, it is favorable that the antimicrobial pattern is difficult to be visually recognized. Therefore, a low-tone pattern image, and ghosting controlled so as to obtain low density can be used for an antimicrobial pattern. In addition, a color that is used for antimicrobial toner can be any one or more of yellow, magenta, cyan, and black. However, at least one color is used for non-antimicrobial toner in order to suppress the cost. A configuration can be adopted in which, for example, only one color is used for antimicrobial toner, as with the present embodiment.

Figure 4:
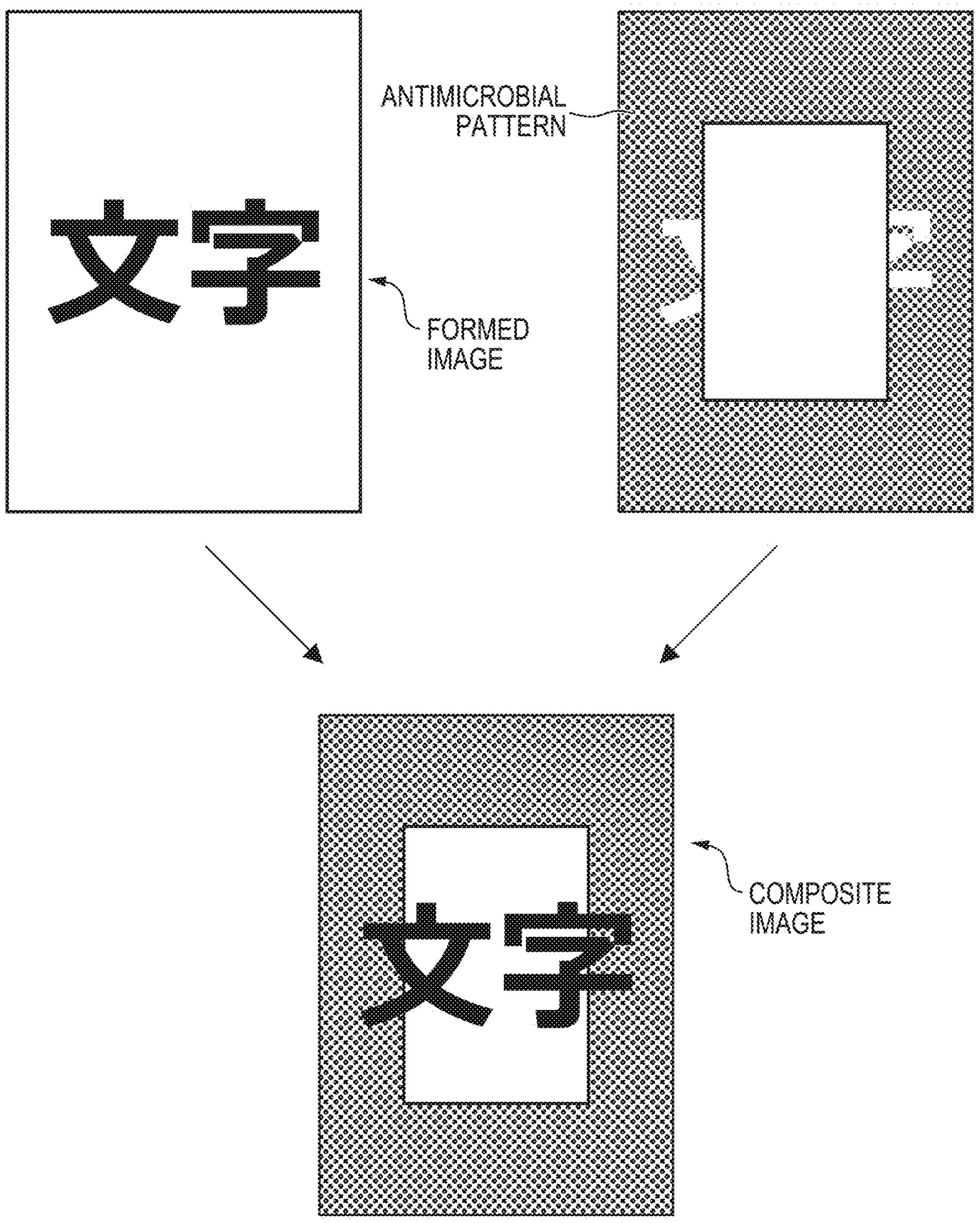
FIG. 4 is a diagram showing an example of a formed image, an antimicrobial pattern image, and a composite image according to an embodiment.

Note that, when a formed image and an antimicrobial pattern overlap each other, the color of the formed image can change under the influence of the antimicrobial pattern. For this reason, the control unit 80 can change the antimicrobial pattern based on the formed image. FIG. 4 shows an example thereof. Similarly to FIG. 3, the antimicrobial pattern is a mid-tone pattern image having a predetermined width along the periphery of a sheet. However, the predetermined width of the antimicrobial pattern in FIG. 4 is larger than the predetermined width of the antimicrobial pattern in FIG. 3, and thus the antimicrobial pattern overlaps portions of the formed image. In the overlapping portions, the yellow color of the antimicrobial pattern affects the formed image. In this case, the control unit 80 can set the density of the antimicrobial pattern in the regions overlapping the formed image below the original density, for example, to 0. FIG. 4 shows a case where the density of the antimicrobial pattern in the regions overlapping the formed image is set to 0. By performing this processing, the color of the formed image can be kept from being affected by the antimicrobial pattern.

Note that, for example, in a case where a formed image and an antimicrobial pattern overlap each other, if the color of the antimicrobial pattern around the overlapping region and the color of the formed image in the overlapping region are the same, and the tone difference is small, the visual recognizability of the formed image in the overlapping region decreases. The control unit 80 can be configured to ensure, in this case, the visual recognizability of the formed image by changing the antimicrobial pattern such that the difference between the tone in at least a region of the antimicrobial pattern that surrounds the overlapping region and the tone of the formed image in the overlapping region exceeds a predetermined value. As an example, the control unit 80 can change the tone of the antimicrobial pattern such that the tone in at least the region of the antimicrobial pattern that surrounds the overlapping region is lower than the tone of the formed image in the overlapping region, and the difference between the tones is larger than the predetermined value. Note that, when the difference between the tone of the antimicrobial pattern in the surrounding region and the tone of the formed image in the overlapping region is larger than the predetermined value, the control unit 80 does not need to change the tone of the antimicrobial pattern. Furthermore, the control unit 80 can also be configured to change the tone of the entire antimicrobial pattern, instead of changing only the tone of the antimicrobial pattern in the surrounding region.

In short, when forming an antimicrobial pattern based on image data, the control unit 80 stores basic antimicrobial image data for a basic antimicrobial pattern in advance. As described above, the control unit 80 then generates composite image data based on image data for a formed image (image data to be formed in the formed image) and the basic antimicrobial image data, and forms a composite image that is based on the composite image data, on the sheet P. Here, the composite image data does not need to be data obtained by simply adding the formed image and the basic antimicrobial pattern together. As described above, the control unit 80 can correct the basic antimicrobial image data based on the formed image represented by the image data for the formed image, generate antimicrobial image data representing an antimicrobial pattern, generate composite image data based on the image data for the formed image and the antimicrobial image data. In a region in which the basic antimicrobial pattern and the formed image overlap each other, for example, the control unit 80 can lower the tone of the basic antimicrobial pattern, for example, to 0. Furthermore, when the color in a region of the basic antimicrobial pattern that surrounds the overlapping region and the color of the formed image in the overlapping region are the same, and the difference in tone is smaller than the predetermined value, it is possible to change the tone in at least the region of the basic antimicrobial pattern that surrounds the overlapping region, and set the tone difference to the predetermined value or larger.

In addition, when a low-tone pattern image is formed as an antimicrobial pattern on the sheet P using the yellow antimicrobial toner Ty', it is difficult to visually recognize the antimicrobial pattern, but it is difficult to determine whether or not the print article has antimicrobial properties. For this reason, the control unit 80 can form a composite image that further includes a recognition image for causing the user to visually recognize that the print article has antimicrobial properties, in addition to the antimicrobial pattern. Toner that is used for the recognition image is at least one type of toner out of the four types of toner, and may be antimicrobial toner or non-antimicrobial toner. Note that, from a viewpoint of maintaining the antimicrobial properties, antimicrobial toner is advantageous, and from a viewpoint of cost, non-antimicrobial toner is advantageous. Image data for the recognition image is also stored in the control unit 80 in advance. In addition, similarly to the antimicrobial pattern, when the recognition image overlaps the formed image or the antimicrobial pattern, the control unit 80 can change the recognition image in the overlapping portion.

Figure 5A:
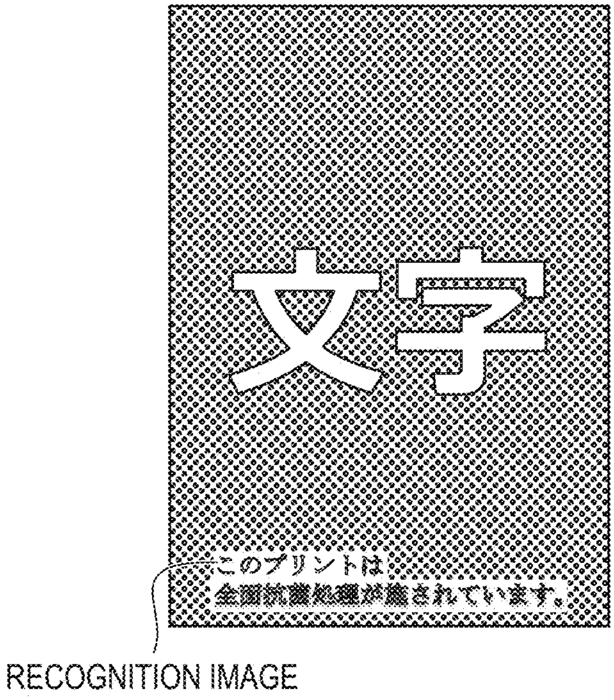
FIGS. 5A to 5D are diagrams showing examples of a composite image that includes a recognition image according to an embodiment.
Figure 5B:
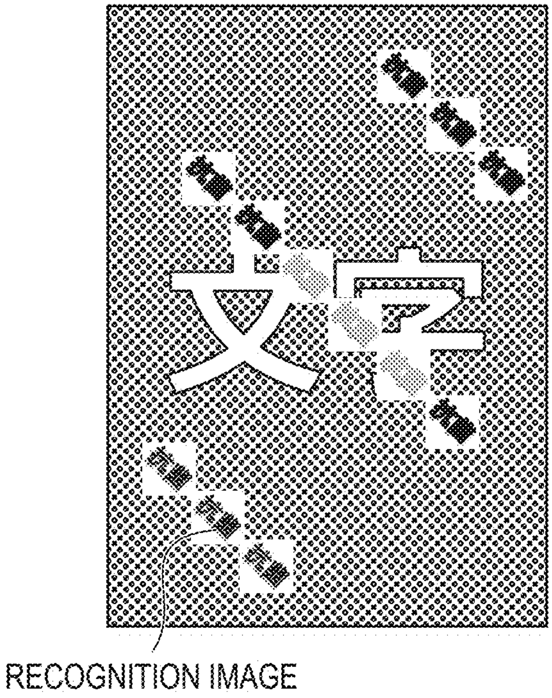

FIGS. 5A to 5D show examples of the recognition image. Note that, in FIGS. 5A to 5D, a blank image at the center is a formed image, and a hatched portion is an antimicrobial pattern. In FIGS. 5A and 5B, the antimicrobial pattern is a mid-tone image that covers the entire region of the sheet excluding the region of the formed image (blank region). In addition, in FIG. 5A, a recognition image indicating in writing that the entire surface is antimicrobial is formed in a region different from the region of the formed image. In addition, in FIG. 5B, a recognition image indicating, using regularly arranged letters, that the sheet is antimicrobial is formed.

Figure 5C:
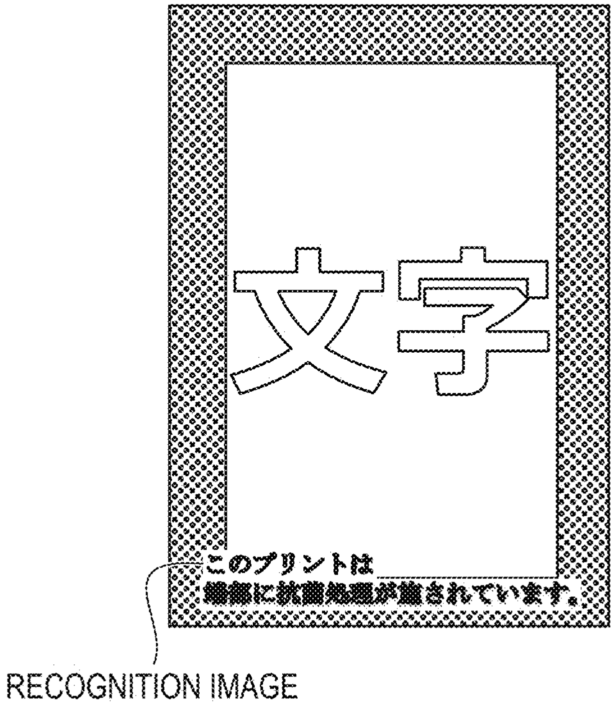
Figure 5D:
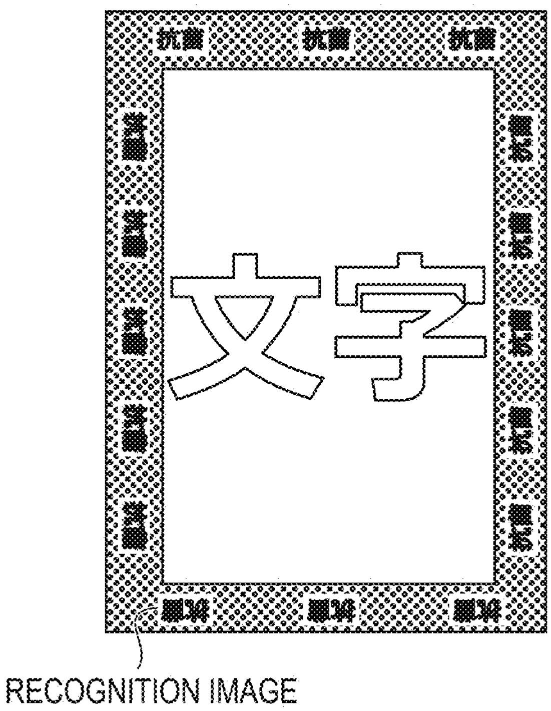

In addition, in FIGS. 5C and 5D, the antimicrobial pattern is a mid-tone image having a predetermined width in the peripheral portion of the sheet. In addition, in FIG. 5C, a recognition image indicating in writing that the edge portion of the sheet is antimicrobial is formed in a region different from the region of the formed image. In addition, in FIG. 5D, in the region in which the antimicrobial pattern is formed, that is to say, a region in which the sheet is antimicrobial (hereinafter, an "antimicrobial region"), a recognition image indicating in writing that the region is antimicrobial is formed. Note that, in FIGS. 5A to 5D, the recognition image is a text image. However, any graphic such as a mark or an illustration indicating an antimicrobial region on the sheet can be used as a recognition image. Note that a configuration can be adopted in which at least a portion of the recognition image or the entire recognition image is formed in the antimicrobial region in order to cause the user to recognize the antimicrobial region.

When an antimicrobial region covers the entire region of the sheet, the consumption amount of the antimicrobial toner increases, thus increasing the cost. Therefore, in order to suppress an increase in the cost while maintaining the antimicrobial effect, a configuration can be adopted in which only a region that is touched by hands of many users is used as an antimicrobial region. A plurality of examples of antimicrobial region for achieving both the antimicrobial effect and low cost will be described below. Note that, in the following examples, a hatched region indicates an antimicrobial region, and a blank region indicates a region in which an antimicrobial pattern is not formed (hereinafter, a "non-antimicrobial region").

Examples 1

Figure 6:
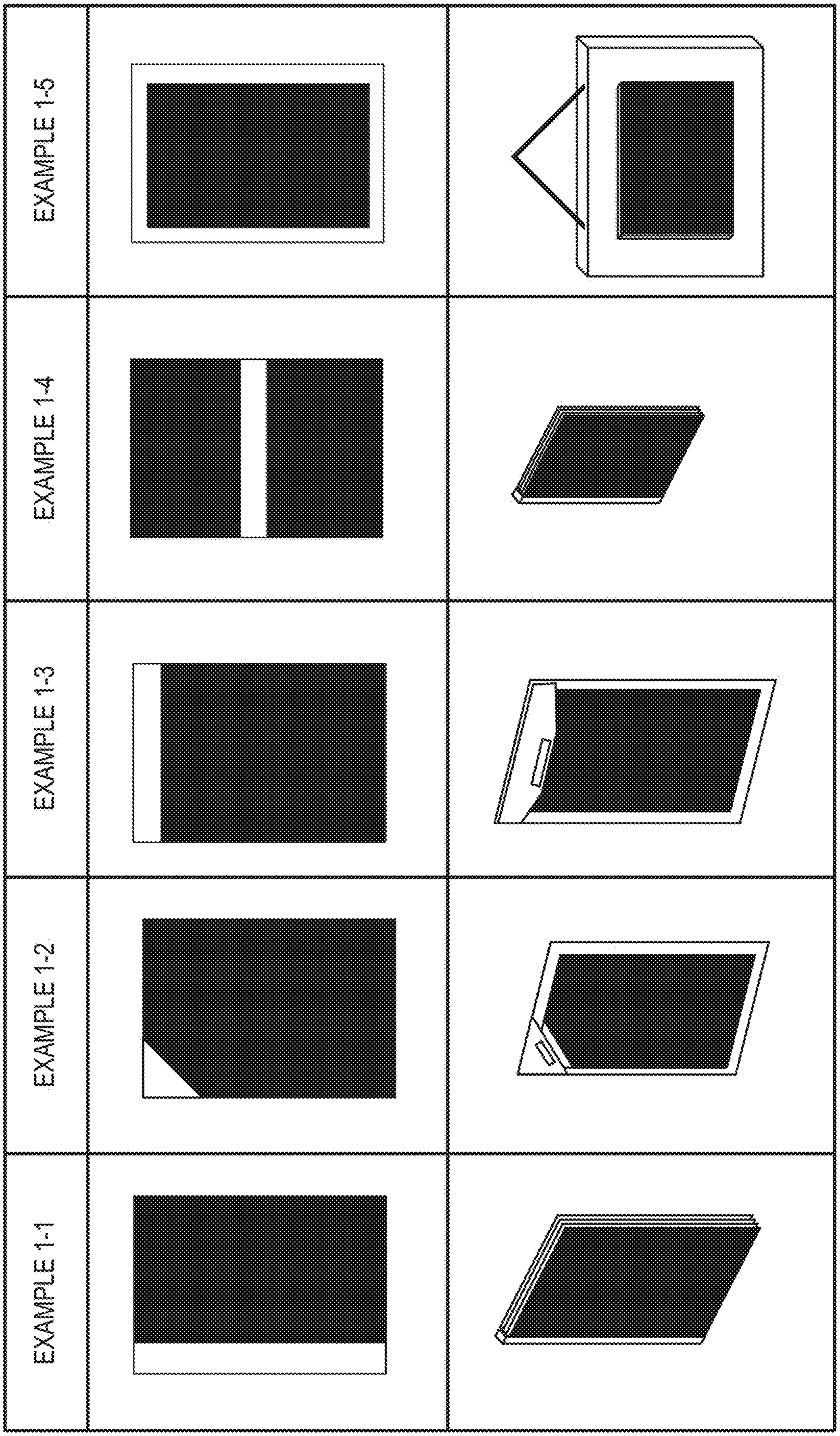
FIG. 6 is a diagram showing various examples of an antimicrobial pattern image.

All of examples 1 shown in FIG. 6 use a portion of a sheet as an antimicrobial region, that is to say, provide an antimicrobial region and a non-antimicrobial region to a sheet. In the examples 1, a region that is hardly touched by hands of users (users of a print article) is determined based on how the print article is utilized, the determined region is used a non-antimicrobial region, and the other region is used as an antimicrobial region. Note that, in FIG. 6, the upper row includes print articles, and the lower row includes examples of utilization of the print articles (product examples). In addition, FIG. 6 shows only the antimicrobial region on one surface (front surface) of each print article. Handling the other surface (back surface) will be described in other examples.

Examples 1-1 to 1-3 envision a case where the print article is compiled into a booklet, or is filed in a binder. Specifically, a region for punched holes, an adhesive margin, or a binding margin that is unlikely to be touched by hands of users is used as a non-antimicrobial region, and the other region is used as an antimicrobial region. Note that, in the example 1-1, an end portion extending along one long edge of the two long edges of a sheet is used as a non-antimicrobial region. In addition, in the example 1-2, the region of one corner portion of a sheet is used as a non-antimicrobial region. Furthermore, in the example 1-3, an end portion extending along one short side of the two short sides of a sheet is used as a non-antimicrobial region.

The example 1-4 envisions a case where the print article is folded into two to create a booklet. Specifically, a region that serves as a binding margin in the vicinity of the center in the longitudinal direction on a sheet is used as a non-antimicrobial region, and the other regions are used as antimicrobial regions. The example 1-5 envisions a case where the print article is put into a frame or the like, and a region that is hidden by the frame is used as a non-antimicrobial region, and the other region is used as an antimicrobial region.

As described above, by using a region that is unlikely to be touched by hands of users as a non-antimicrobial region and using the other region as an antimicrobial region based on how a print article is used, it is possible to suppress an increase in the cost while maintaining the antimicrobial effect.

Examples 2

Figure 7:
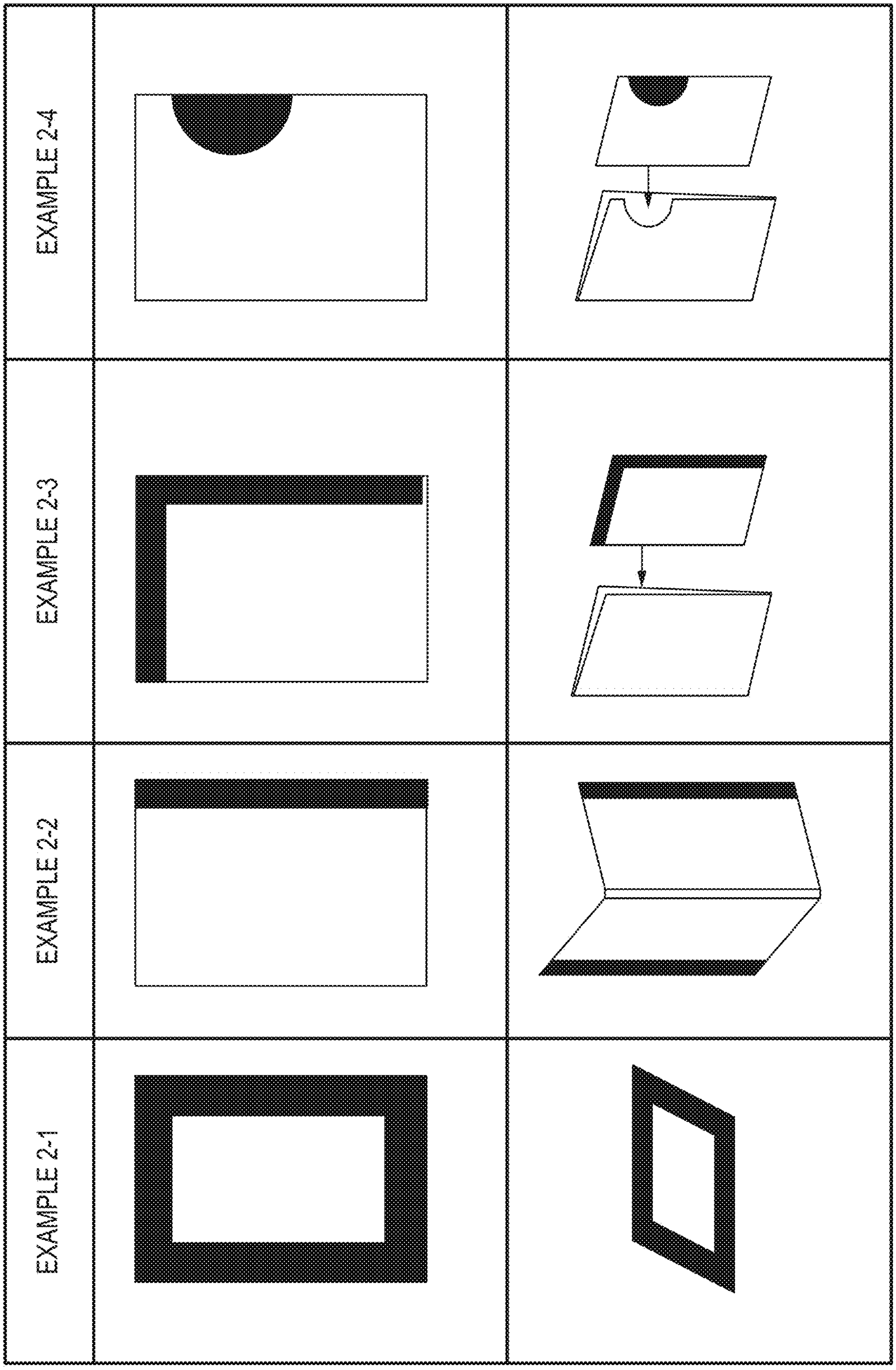
FIG. 7 is a diagram showing various examples of an antimicrobial pattern image.

Similarly to the examples 1, also in examples 2 shown in FIG. 7, a portion of a sheet is used as an antimicrobial region, that is to say, an antimicrobial region and a non-antimicrobial region are provided to a sheet. In the examples 2, a region that is frequently touched by hands of users (users of a print article) is determined based on how the print article is utilized, the determined region is used as an antimicrobial region, and the other region is used as a non-antimicrobial region. Usually, when a user uses a print article, the user grabs an end portion of the print article, and holds the print article. Therefore, in the examples 2-1 to 2-4, an antimicrobial region is provided in an end portion of the print article. Note that, in FIG. 7, the upper row includes print articles, and the lower row includes examples of utilization (product examples) of the print articles. In addition, FIG. 7 shows an antimicrobial region on only one surface (front surface) of each print article. Handling the other surface (back surface) will be described in other examples.

The example 2-1 envisions a case where, when using a print article, a user usually grabs an end portion of the print article, and four edge regions of the print article are used as an antimicrobial region, and the other region is used as a non-antimicrobial region. The example 2-2 envisions a case where a print article is compiled into a booklet, or is filed in a binder, and end portions on the opposite side to an end portion of a sheet that is a region for punched holes, an adhesive margin, or a binding margin are used as antimicrobial regions, and the other region is used as a non-antimicrobial region. This is because a user that uses a booklet or a filed print article usually touches end portion regions that are on the opposite side to an end portion region where the print article is bound.

The example 2-3 envisions a case where a print article is stored in an ordinary clear file with two closed edges, an end portion region corresponding to the two edges of the clear file that are not closed is used as an antimicrobial region, and the other region is used as non-antimicrobial region. Note that, when one edge, three edges, or only a portion of one edge of the clear file is closed instead of two edges, an end portion of a sheet corresponding to a portion (of the clear file) that is not closed can be used as an antimicrobial region. In other words, a region of a print article that is touched by a user during an action of storing and removing the print article in/from a container such as a clear file can be used as an antimicrobial region. The example 2-4 envisions a case where a print article is stored in a clear file or the like provided with an opening portion for removing the print article, and a region corresponding to the opening portion of the clear file is used as an antimicrobial region.

As described above, by using a region that is likely to be touched by a hand of a user as an antimicrobial region and using the other region as a non-antimicrobial region based on how a print article is used, it is possible to suppress an increase in the cost while maintaining the antimicrobial effect. Note that, for example, in the examples 2-3 and 2-4, the orientation of the print article when the print article is stored in a container such as a clear file can differ each time the print article is stored. Therefore, a configuration can be adopted in which an antimicrobial region is set for each of possible orientations of the print article when the print article is stored in the container. In the example 2-4, for example, an antimicrobial region having a semicircular shape is formed on the upper side of the right edge on the front surface, but a configuration can be adopted in which antimicrobial regions having the same shape are formed at a position on the lower side of the left edge on the front surface, a position on the back surface that corresponds to the lower side of the right edge on the front surface, and a position on the back surface that corresponds to the upper side of the left edge on the front surface.

Examples 3

Figure 8A:
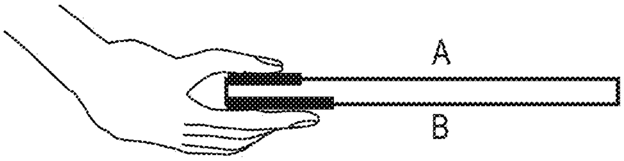
FIG. 8A is a diagram showing an example in which a user holds a print article.
Figure 8B:
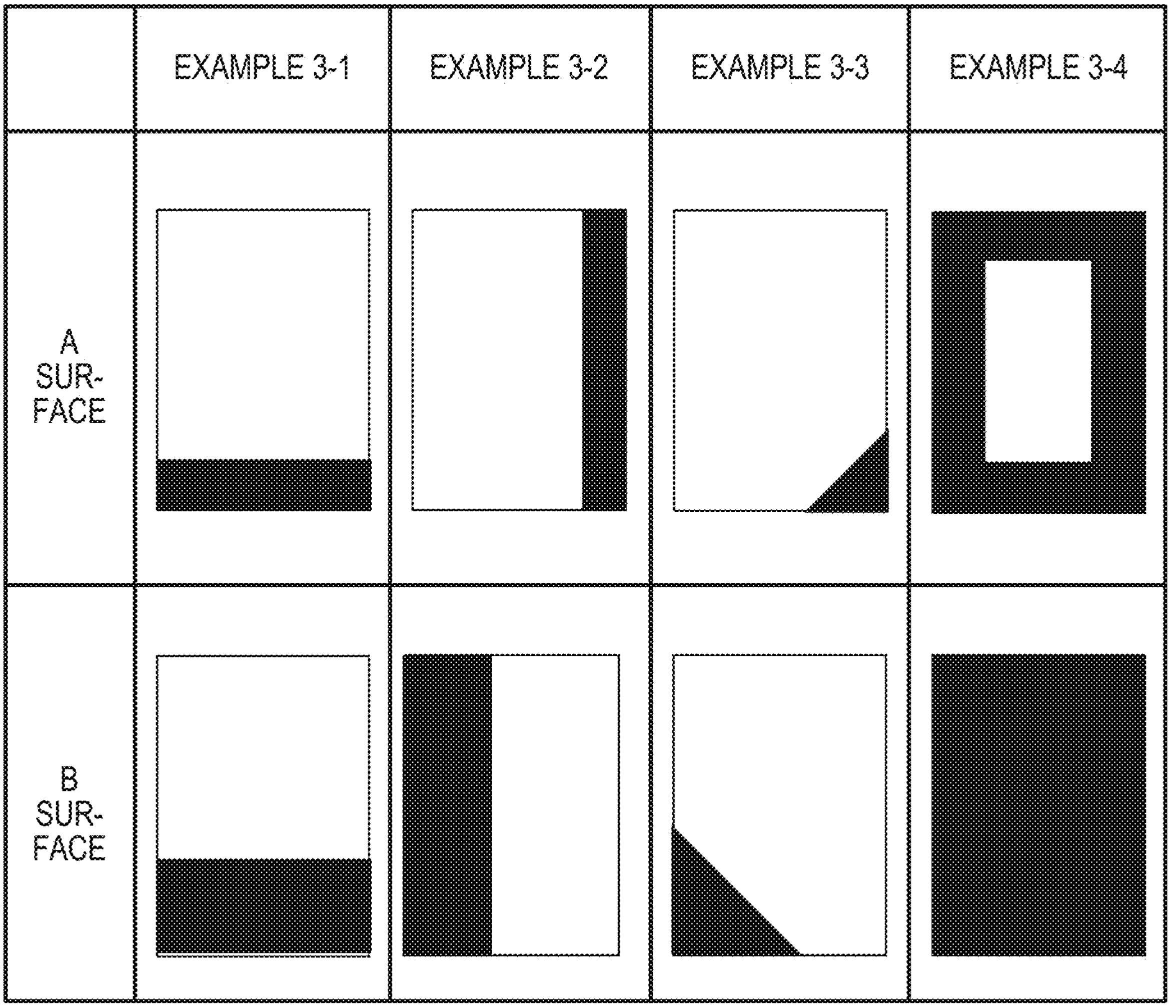
FIG. 8B is a diagram showing various examples of an antimicrobial pattern image.

In examples 3, an antimicrobial region on a back surface will be described. As shown in FIG. 8A, when a user holds a print article, a contact region of the print article that is touched by the user can be larger on the back surface (B surface) on which no formed image is formed than the front surface (A surface) of the print article on which a formed image is formed. For this reason, in the present embodiment, an antimicrobial region on the back surface is set larger than an antimicrobial region on the front side. FIG. 8B shows examples 3-1 to 3-4. Note that FIG. 8B shows a state where the B surface is rotated using the longitudinal direction of the A surface as a rotation axis.

The example 3-1 envisions a case where a lower side of a print article is held, and end portions on the lower side of the print article are used as antimicrobial regions, on both the A surface and the B surface. Note that the width of the antimicrobial region on the B surface (the length in the up-down direction in the figure) is larger than the width of the antimicrobial region on the A surface. Assuming that the width of the antimicrobial region on the A surface is 60 mm, for example, the width of the antimicrobial region on the B surface is 100 mm, for example. The example 3-2 envisions a case where the right side on the A surface of a print article is held, an end portion on the right side of the A surface of the print article and an end portion on the corresponding side of the B surface are used as antimicrobial regions. Note that the width of the antimicrobial region on the B surface (the length in the left-right direction in the figure) is larger than the width of the antimicrobial region on the A surface.

The example 3-3 envisions a case where a corner portion of a print article is held, and a triangular region that includes one corner portion, namely a first corner portion, out of the four corner portions on the A surface is used as an antimicrobial region, and, also on the B surface, a triangular region that includes a first corner portion is used as an antimicrobial region. Note that the area of the antimicrobial region on the B surface is larger than the area of the antimicrobial region on the A surface. The distance from the first corner portion to the edge of the antimicrobial region of that opposes the first corner portion is 60 mm on the A surface and 100 mm on the B surface, for example.

The example 3-4 envisions a case where a print article is passed between users, a case where a print article placed with the front surface thereof directed downward is turned over and is used as with examination paper, and the like. In the example 3-4, an antimicrobial region on the A surface is the region of an outer peripheral portion of the print article, and an antimicrobial region on the B surface covers the entirety of the B surface.

As described above, by setting the antimicrobial region on the back surface of the print article to include the corresponding antimicrobial region on the front surface, a region that is highly likely to be touched by a user when the user actually handles the print article serves as an antimicrobial region, and it is possible to suppress an increase in the cost while maintaining the antimicrobial effect.

Examples 4

Figure 9A:
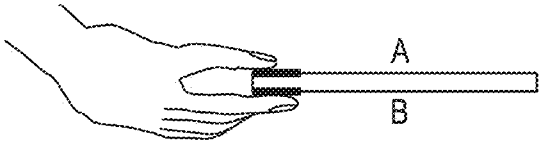
FIG. 9A is a diagram showing an example in which a user holds a print article.
Figure 9B:
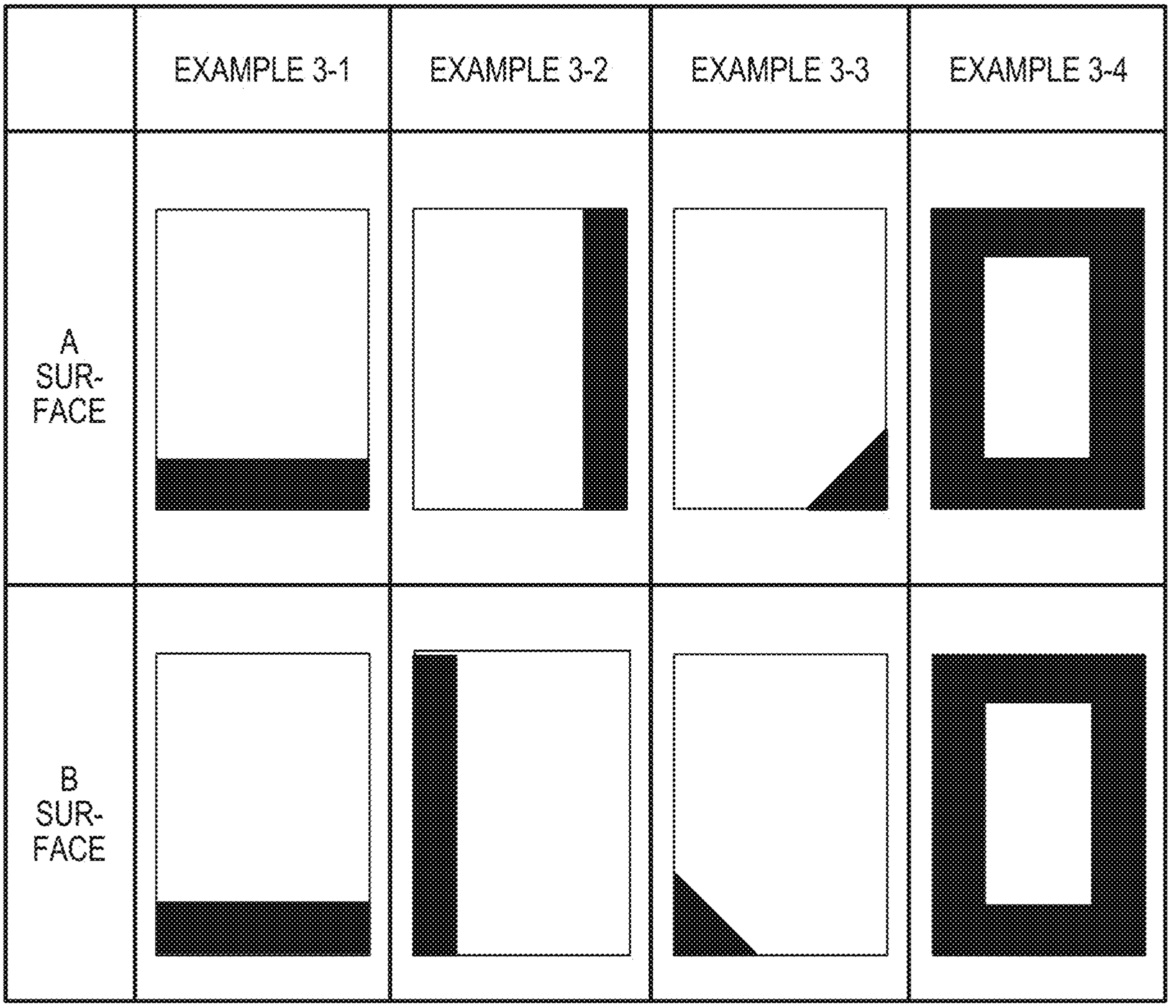
FIG. 9B is a diagram showing various examples of an antimicrobial pattern image.

As shown in FIG. 9A, in a case where a user picks up and holds a print article, or the like, a contact region of the print article that is touched by the user can be substantially the same between the A surface and the B surface. As illustrated in examples 4-1 to 4-4 in FIG. 9B, in examples 4, the antimicrobial region on the B surface is provided at a position exactly corresponding to the antimicrobial region on the A surface.

With the above configuration, it is possible to suppress an increase in the cost while maintaining the antimicrobial effect. Note that, according to the present examples, it is possible to suppress the usage amount of antimicrobial toner compared with the examples 3. Note that the examples 3 and the examples 4 are for a case where a formed image is formed on one surface (front surface), and no formed image is formed on the other surface. When formed images are formed on the two surfaces of a sheet, a configuration can be adopted in which the two surfaces are handled as front surfaces.

Examples 5

Figure 10:
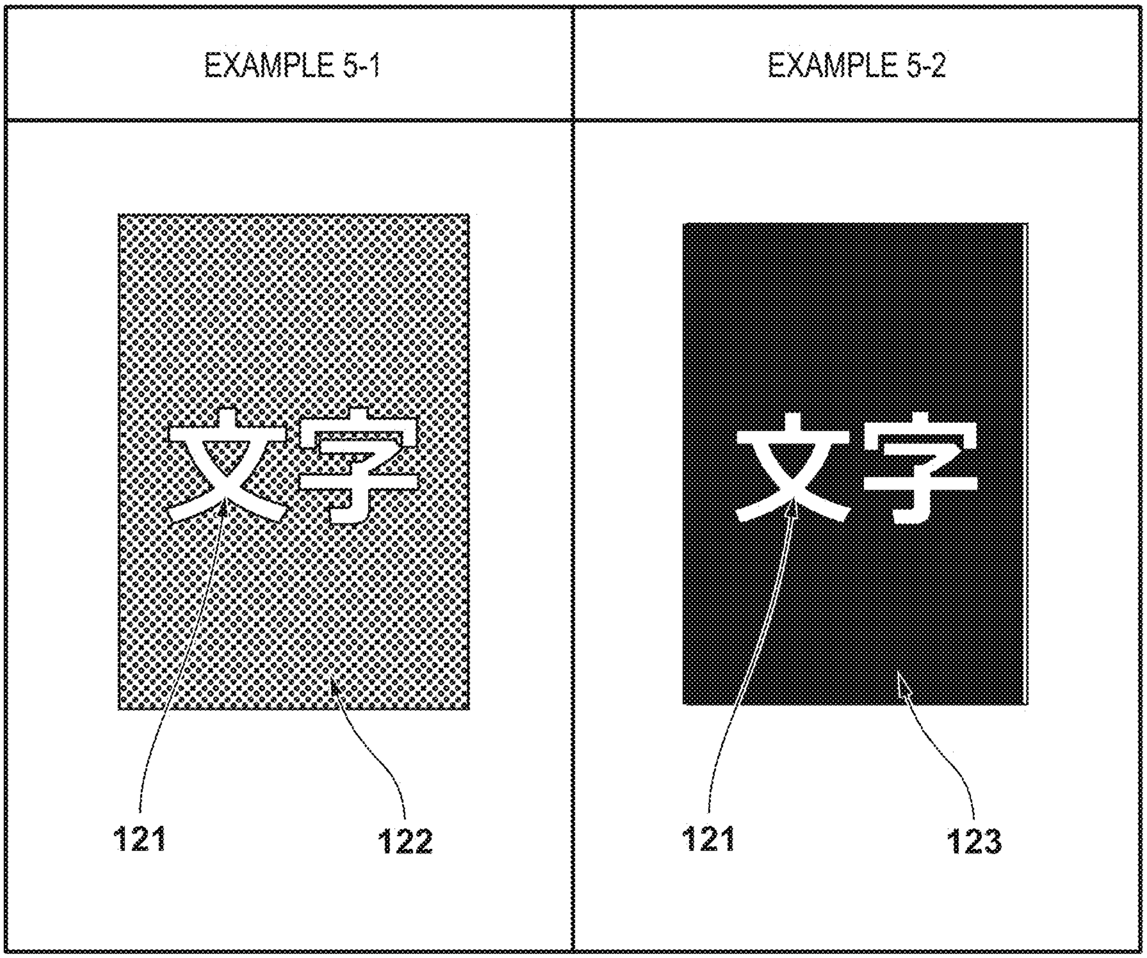
FIG. 10 is a diagram showing various examples of an antimicrobial pattern image.

Usually, users use a print article in order to view a formed image of text/photos and the like. Therefore, the users more frequently touch a region other than the formed image. In the present examples, a region other than the region of a formed image is used as an antimicrobial region. Note that, for example, antimicrobial toner is used as black toner only, and non-antimicrobial toner is used as yellow toner, magenta toner, and cyan toner. In the examples 5-1 and 5-2 shown in FIG. 10, reference numeral 121 indicates a formed image that has been formed using toner of one or more of yellow, magenta, and cyan, which is non-antimicrobial toner. Reference numeral 122 indicates a mid-tone antimicrobial pattern formed using antimicrobial black toner, and reference numeral 123 indicates a maximum-tone antimicrobial pattern formed using antimicrobial black toner. The density of the antimicrobial pattern can be adjusted in accordance with required antimicrobial properties, for example.

With the above configuration, it is possible to suppress an increase in the cost while maintaining the antimicrobial effect.

Figure 11:
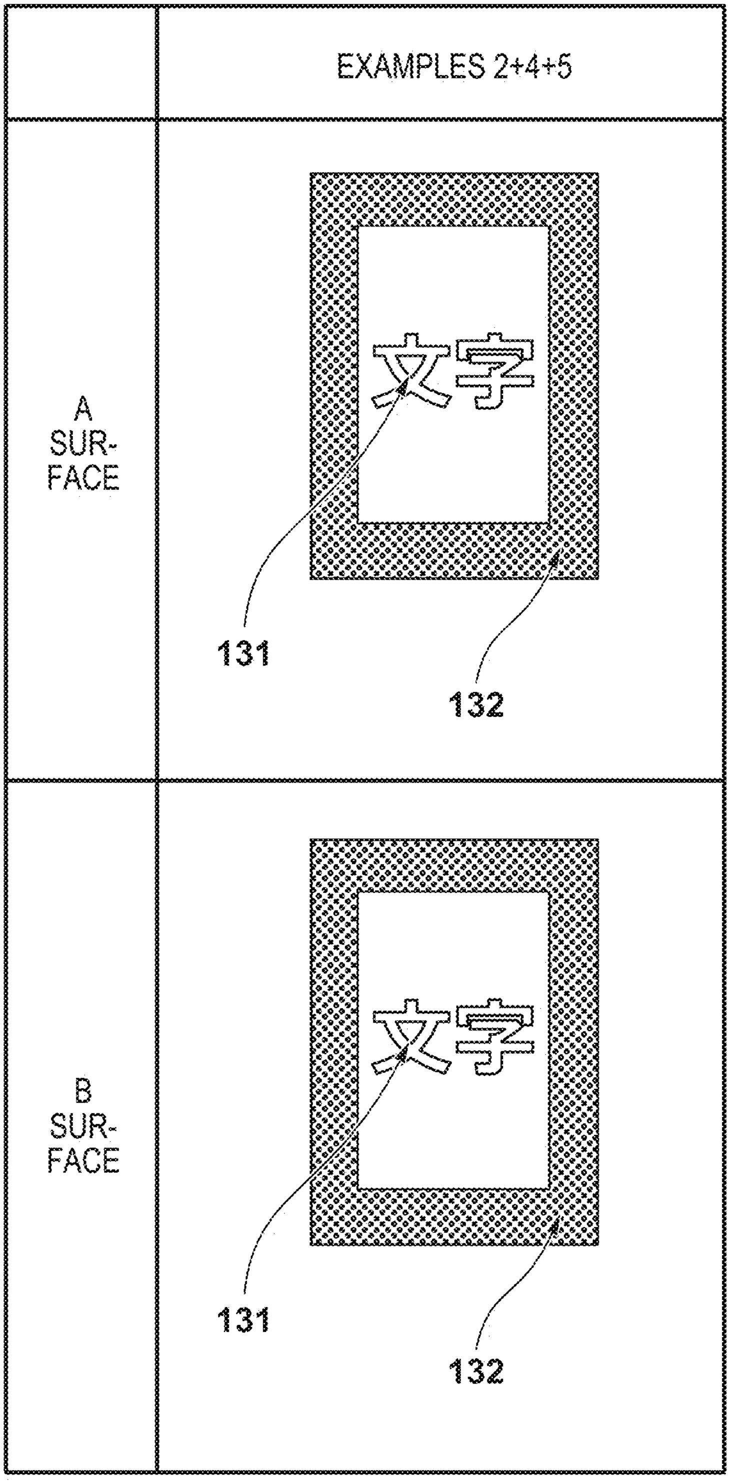
FIG. 11 is a diagram showing examples of an antimicrobial pattern image.

Note that at least two of the above the examples 1 to 5 can be combined. FIG. 11 shows a case where the examples 2, 4, and 5 are combined. That is to say, on both the A surface and the B surface, a region in which no formed image is formed, out of end portion regions of the four edges of a print article that are frequently grabbed by a user, is used as an antimicrobial region.

The image forming apparatus 10 can be configured to be able to form one or more of the various antimicrobial patterns described in the above examples, for example. When the image forming apparatus 10 is configured to be able to form a plurality of antimicrobial patterns, the image forming apparatus 10 can be configured such that the user can select an antimicrobial pattern to be formed on each print article. The user can select an antimicrobial pattern to be formed in accordance with how the print article will be used and required antimicrobial performance, for example. Furthermore, the image forming apparatus 10 can be configured such that the user can select the tone of the antimicrobial pattern in accordance with the required antimicrobial performance.

FIG. 12 shows evaluations in terms of "cost", "handling", and "antimicrobial properties in region other than formed image" with respect to the above examples, the combination of the examples 2, 4, and 5 shown in FIG. 11, and a comparison example. Note that "cost" represents evaluations on whether or not the usage amount of antimicrobial toner in a portion that is unlikely to be touched by a user is small. In addition, "handling" represents evaluations in terms of ease of handling, for example, evaluations on whether or not the degree of versatility of a print article in terms of use is high. "Antimicrobial properties in region other than formed image" represents evaluations on whether or not use of antimicrobial toner for a formed image is suppressed. Note that, in the comparison example, the entire region of one surface is used as an antimicrobial region. Note that "O" indicates "effective", "Δ" indicates" effective in a specific state (the orientation of a surface or the like)", and "X" indicates "not effective".

The examples other than the comparison example are determined as "O" due to the presence of a non-antimicrobial region, but the comparison example is determined as "X" due to the entire region being an antimicrobial region. In the examples 3 and 4 and the combination of the examples 2, 4, and 5, it is safe to touch the back surface that is out of sight, which provides superiority to other examples in terms of ease of handling. In addition, in the example 5 and the combination of the examples 2, 4, and 5, it is possible to suppress consumption of antimicrobial toner for a formed image, which provides superiority to other examples.

Next, an example of criterion for selecting a color to be used as antimicrobial toner, from toner of a plurality of colors used for image formation will be described. In the image forming apparatus 10 shown in FIG. 1, toner images are transferred onto the intermediate transfer member 3 in the order of the cartridges 7*y*, 7*m*, 7*c*, and 7*k*. Therefore, as shown in FIG. 13, when four color toner images are overlaid on the intermediate transfer member 3, the antimicrobial yellow toner Ty' forms the lowermost layer, and the non-antimicrobial magenta toner Tm, the non-antimicrobial cyan toner Tc, and the non-antimicrobial black toner Tk are overlaid thereon in the stated order.

Figure 13:
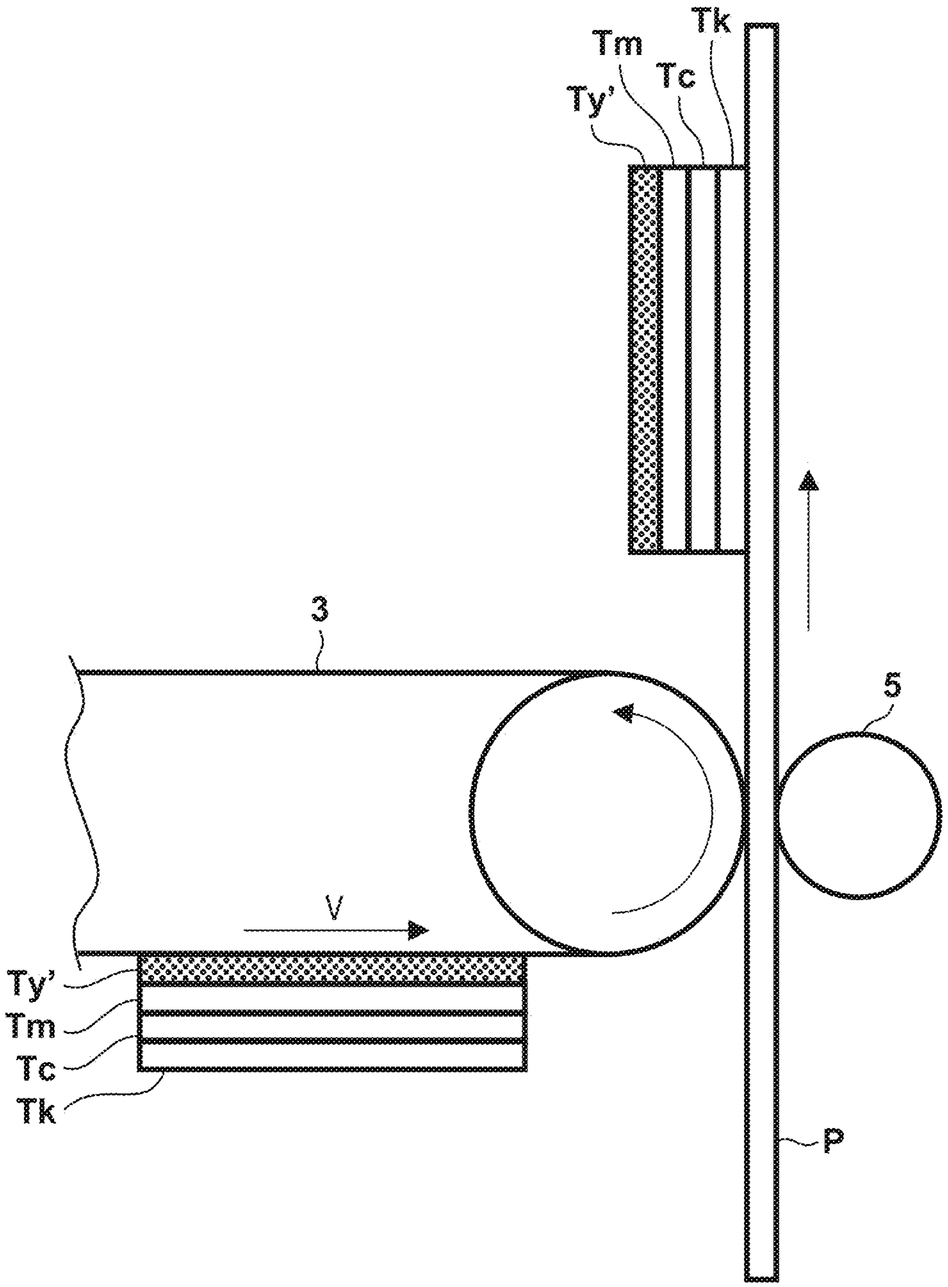
FIG. 13 is a diagram showing the positional relationship between toner of different colors being transferred onto a sheet according to an embodiment.

Therefore, as shown in FIG. 13, in the reversed order from the intermediate transfer member 3, that is to say, the non-antimicrobial black toner Tk forms the lowermost layer, the non-antimicrobial cyan toner Tc and the non-antimicrobial magenta toner Tm are overlaid on the sheet P in the stated order, and the antimicrobial yellow toner Ty' is overlaid thereon. Even when cyan, magenta, and black that do not form the uppermost layer are used as antimicrobial toner, the antimicrobial effect is achieved, but, by using antimicrobial toner for the uppermost toner, the antimicrobial effect can be further increased. Note that the cartridges 7 are interchangeable, and thus it is also possible to switch between the use of the cartridge 7*y* that contains antimicrobial toner and the cartridge 7*y* that contains non-antimicrobial toner in accordance with need for the antimicrobial properties.

Figure 14:
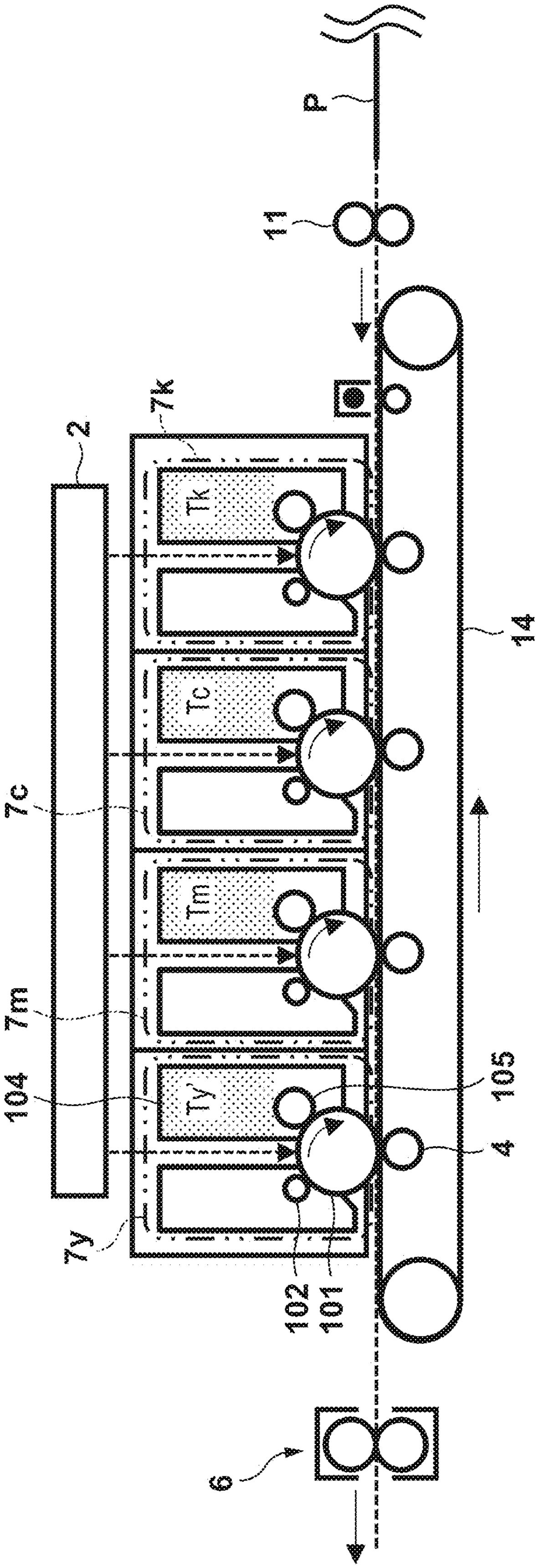
FIG. 14 is a schematic cross-sectional view of an image forming apparatus according to an embodiment.

FIG. 14 shows a portion of an image forming apparatus that includes a conveyance belt 14 for conveying the sheet P, in place of the intermediate transfer member 3. Note that constituent elements similar to those of the image forming apparatus 10 shown in FIG. 1 are given the same reference numerals. In the image forming apparatus shown in FIG. 14, while the sheet P is conveyed on the conveyance belt 14, toner images of the photosensitive members 101 are transferred onto the sheet P in order. Therefore, in the case of the configuration in FIG. 14, a configuration can be adopted in which antimicrobial toner is used for the cartridge 7*y* for forming a yellow toner image that is lastly transferred onto the sheet P.

In addition, the image forming apparatus 10 can also be configured such that the user can select one from two types of image forming modes when the cartridge 7*y* that contains antimicrobial toner is mounted. Specifically, for example, the two types of image forming modes are an antimicrobial priority mode and an image quality priority mode. When the antimicrobial priority mode is selected, the control unit 80 forms an antimicrobial pattern as described above. On the other hand, when the image quality priority mode is selected, the control unit 80 forms only a formed image on the sheet P based on image data for the formed image without forming an antimicrobial pattern.

In addition, antimicrobial toner may be colorless and transparent toner that does not contain any colorant (hereinafter, "transparent toner"). A configuration may be adopted in which magenta, cyan, and yellow toner used by the image forming apparatus 10 for image formation is used as non-antimicrobial toner, and transparent toner that does not contain any colorant is used as antimicrobial toner, for example. That is to say, the image forming apparatus 10 forms an image using a plurality of different types of toner. Here, types can be distinguished based on whether or not the toner is transparent and the color of the toner. Four types of toner, namely yellow toner, magenta toner, cyan toner, and black toner are different in color, and thus are different types of toner, for example. In addition, for example, yellow toner, magenta toner, and cyan toner are not transparent, but are different in color, and transparent toner is transparent, and thus four types of toner, namely the yellow toner, the magenta toner, and the cyan toner, and the transparent toner are different types of toner.

Note that, when transparent toner is used as antimicrobial toner, the antimicrobial toner is used to form an antimicrobial pattern only, and is not used to form a formed image or a recognition image. In addition, since the antimicrobial toner is transparent, a configuration can be adopted in which an antimicrobial pattern is not changed even when a formed image and the antimicrobial pattern overlap each other.

According to the present invention, it is possible to suppress an increase in cost while maintaining an antimicrobial effect.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An image forming apparatus comprising:

a photosensitive member, a charging unit configured to charge the photosensitive member by outputting an charging voltage, a exposure unit configured to expose the charged photosensitive member to form an electrostatic latent image on the photosensitive member, and a developing unit configured to develop the electrostatic latent image on the photosensitive member using the first toner by outputting a developing voltage, an image forming unit configured to form an image on a sheet by forming a plurality of toner images using a plurality of types of toner, and transfer the plurality of toner images onto the sheet, or transfer the plurality of toner images onto the sheet via an intermediate transfer member; and a controller configured to control the image forming unit to form a formed image and an antimicrobial pattern on the sheet during image formation that is based on first image data representing the formed image by controlling at least one of the charging voltage and the developing voltage, wherein the antimicrobial pattern is formed in a region in a conveyance direction of the sheet in which the formed image is not formed, wherein at least one first toner out of the plurality of types of toner is antimicrobial toner that includes an antimicrobial agent, at least one second toner out of the plurality of types of toner is non-antimicrobial toner that does not contain the antimicrobial agent, and the antimicrobial pattern is formed using the first toner.

2. The image forming apparatus according to claim 1, wherein the at least one first toner is a transparent toner or toner of a first color, the second toner is a toner of one or more second colors different from the first color, and the formed image is formed using the toner of the one or more second colors.

3. The image forming apparatus according to claim 1, wherein the controller is configured to cause the image forming unit to generate second image data representing a composite image that includes the formed image and the antimicrobial pattern based on the first image data, and to perform the image formation based on the second image data, thereby forming the antimicrobial pattern on the sheet.

4. The image forming apparatus according to claim 3, wherein the antimicrobial pattern is formed in a partial region of the sheet.

5. The image forming apparatus according to claim 3, wherein the antimicrobial pattern is formed in a partial region of the sheet, the partial region being a region that includes an end portion of the sheet.

6. The image forming apparatus according to claim 3, wherein the antimicrobial pattern is formed on both a first surface and a second surface of the sheet, and the antimicrobial pattern is formed at least in a second region on the second surface that corresponds to a first region on the first surface in which the antimicrobial pattern is formed.

7. The image forming apparatus according to claim 6, wherein a third region on the second surface in which the antimicrobial pattern is formed is the same as the second region.

8. The image forming apparatus according to claim 6, wherein a third region on the second surface in which the antimicrobial pattern is formed includes the second region.

9. The image forming apparatus according to claim 3, wherein the antimicrobial pattern is formed in a region that is different from a region in which the formed image is formed, on a surface of the sheet on which the formed image is formed.

10. The image forming apparatus according to claim 3, wherein the antimicrobial pattern is formed in an entire region that is different from a region in which the formed image is formed, on a surface of the sheet on which the formed image is formed.

11. The image forming apparatus according to claim 3, wherein, when the formed image and the antimicrobial pattern overlap each other, the controller is configured to lower tone of the antimicrobial pattern in an overlapping region in which the formed image and the antimicrobial pattern overlap each other, below original tone.

12. The image forming apparatus according to claim 3, wherein, when a color of the formed image in an overlapping region in which the formed image and the antimicrobial pattern overlap each other and a color in a region of the antimicrobial pattern that surrounds the overlapping region are the same, and a difference in tone is smaller than a predetermined value, the controller is configured to change tone in the region of the antimicrobial pattern such that the difference between the tone in the region of the antimicrobial pattern and the tone of the formed image in the overlapping region is larger than or equal to the predetermined value.

13. The image forming apparatus according to claim 1, wherein the controller is configured to cause the image forming unit to generate second image data representing a composite image that includes the formed image, the antimicrobial pattern, and a recognition image based on the first image data, and to perform the image formation based on the second image data, thereby forming the antimicrobial pattern on the sheet, and the recognition image is an image indicating that the composite image includes the antimicrobial pattern.

14. The image forming apparatus according to claim 13, wherein the plurality of types of toner are a plurality of colors of toner, and the recognition image is formed using at least one of the plurality of colors of toner.

15. The image forming apparatus according to claim 13, wherein one of the plurality of types of toner is transparent toner, and the recognition image is formed using toner out of the plurality of types of toner that is different from the transparent toner.

16. The image forming apparatus according to claim 13, wherein at least a portion of the recognition image is formed over the antimicrobial pattern.

17. The image forming apparatus according to claim 13, wherein the recognition image indicates a region of the sheet in which the antimicrobial pattern is formed.

18. The image forming apparatus according to claim 1, wherein the at least one first toner is one first toner, the image forming unit is configured to transfer the plurality of toner images onto the sheet in order, and a toner image of the first toner is transferred to the sheet in last among the plurality of toner images.

19. The image forming apparatus according to claim 1, wherein the at least one first toner is one first toner, the image forming unit is configured to transfer the plurality of toner images onto the intermediate transfer member in order, and a toner image of the first toner is transferred to the intermediate transfer member in first among the plurality of toner images.

20. The image forming apparatus according to claim 1, wherein, when a first mode is set, the controller is configured to control the image forming unit to form the formed image and the antimicrobial pattern on the sheet, and when a second mode is set, the controller is configured to control the image forming unit to form only the formed image on the sheet.

* * * * *